US008812592B2

(12) United States Patent
Deng

(10) Patent No.: US 8,812,592 B2
(45) Date of Patent: Aug. 19, 2014

(54) INFORMATION RECOMMENDATION METHOD, RECOMMENDATION ENGINE, NETWORK SYSTEM

(75) Inventor: Rong Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/530,728

(22) Filed: Jun. 22, 2012

(65) Prior Publication Data

US 2013/0031173 A1   Jan. 31, 2013

Related U.S. Application Data

(63) Continuation of application No. PCT/CN2011/077827, filed on Jul. 30, 2011.

(51) Int. Cl.
| | | |
|---|---|---|
| G06F 15/16 | (2006.01) | |
| G06Q 30/02 | (2012.01) | |
| H04L 29/08 | (2006.01) | |

(52) U.S. Cl.
CPC ............ *G06Q 30/02* (2013.01); *G06Q 30/0255* (2013.01); *H04L 67/22* (2013.01)
USPC ............................ 709/204; 715/753; 705/319

(58) Field of Classification Search
USPC ............................ 709/204; 705/319; 715/753
See application file for complete search history.

(56) References Cited

U.S. PATENT DOCUMENTS

| | | | | |
|---|---|---|---|---|
| 7,756,753 | B1 * | 7/2010 | McFarland | 705/26.1 |
| 7,904,511 | B2 * | 3/2011 | Ryan et al. | 709/204 |
| 8,056,118 | B2 * | 11/2011 | Piliouras | 726/2 |
| 8,095,432 | B1 * | 1/2012 | Berman et al. | 705/26.7 |
| 8,180,804 | B1 * | 5/2012 | Narayanan et al. | 707/798 |
| 8,250,145 | B2 * | 8/2012 | Zuckerberg et al. | 709/204 |
| 8,583,480 | B2 * | 11/2013 | Byrne | 705/14.4 |
| 2008/0103907 | A1 * | 5/2008 | Maislos et al. | 705/14 |

(Continued)

FOREIGN PATENT DOCUMENTS

| | | |
|---|---|---|
| CN | 101849229 A | 9/2010 |
| CN | 101916286 A | 12/2010 |
| CN | 101957834 A | 1/2011 |
| WO | 2009131408 A2 | 10/2009 |

OTHER PUBLICATIONS

International search report for International application No. PCT/CN2011/077827, dated Nov. 3, 2011, total 10 pages.

(Continued)

*Primary Examiner* — Alina N Boutah
(74) *Attorney, Agent, or Firm* — Leydig, Voit & Mayer, Ltd.

(57) ABSTRACT

An information recommendation method, a recommendation engine, and a network system are disclosed in embodiments of the present invention. The method includes: acquiring a friend list of a user from a data source with a social relationship; acquiring a behavior record of a friend in the friend list of the user from a user behavior database; generating recommendation information matched with current behavior of the user, according to the behavior record of the friend in the friend list of the user and information of the current behavior of the user; and sending the recommendation information to an application website. Through the embodiments of the present invention, when information is recommended to a user, the recommendation information can be generated based on the social relationship and according to the behavior record of the friend of the user.

14 Claims, 9 Drawing Sheets

(56) References Cited

U.S. PATENT DOCUMENTS

| | | | |
|---|---|---|---|
| 2008/0270038 A1* | 10/2008 | Partovi et al. | 702/19 |
| 2009/0055915 A1* | 2/2009 | Piliouras | 726/8 |
| 2009/0070412 A1* | 3/2009 | D'Angelo et al. | 709/203 |
| 2009/0083117 A1* | 3/2009 | Svendsen et al. | 705/10 |
| 2009/0100469 A1* | 4/2009 | Conradt et al. | 725/46 |
| 2009/0125588 A1* | 5/2009 | Black et al. | 709/204 |
| 2009/0144306 A1* | 6/2009 | Min et al. | 707/101 |
| 2009/0164514 A1* | 6/2009 | Svendsen et al. | 707/104.1 |
| 2009/0222348 A1* | 9/2009 | Ransom et al. | 705/14 |
| 2009/0248494 A1* | 10/2009 | Hueter et al. | 705/10 |
| 2009/0271370 A1* | 10/2009 | Jagadish et al. | 707/3 |
| 2010/0064325 A1* | 3/2010 | Fishman et al. | 725/61 |
| 2010/0125490 A1* | 5/2010 | Kiciman et al. | 705/14.1 |
| 2010/0153175 A1* | 6/2010 | Pearson et al. | 705/10 |
| 2010/0228617 A1* | 9/2010 | Ransom et al. | 705/14.25 |
| 2010/0268661 A1* | 10/2010 | Levy et al. | 705/347 |
| 2010/0287033 A1* | 11/2010 | Mathur | 705/10 |
| 2010/0332330 A1* | 12/2010 | Goel et al. | 705/14.66 |
| 2011/0029636 A1* | 2/2011 | Smyth et al. | 709/217 |
| 2011/0040586 A1* | 2/2011 | Murray et al. | 705/7 |
| 2011/0066497 A1* | 3/2011 | Gopinath et al. | 705/14.53 |
| 2011/0106597 A1* | 5/2011 | Ferdman et al. | 705/14.11 |
| 2011/0107374 A1* | 5/2011 | Roberts et al. | 725/46 |
| 2011/0137989 A1* | 6/2011 | Kiciman et al. | 709/204 |
| 2011/0153414 A1* | 6/2011 | Elvekrog et al. | 705/14.43 |
| 2011/0173198 A1* | 7/2011 | Malleshaiah et al. | 707/737 |
| 2011/0178881 A1* | 7/2011 | Pulletikurty | 705/14.73 |
| 2011/0185020 A1* | 7/2011 | Ramamurthy et al. | 709/204 |
| 2011/0196863 A1* | 8/2011 | Marcucci et al. | 707/728 |
| 2011/0196922 A1* | 8/2011 | Marcucci et al. | 709/204 |
| 2011/0238608 A1* | 9/2011 | Sathish | 706/47 |
| 2011/0238754 A1* | 9/2011 | Dasilva et al. | 709/204 |
| 2011/0246907 A1* | 10/2011 | Wang et al. | 715/751 |
| 2011/0264736 A1* | 10/2011 | Zuckerberg et al. | 709/204 |
| 2011/0276565 A1* | 11/2011 | Zheng et al. | 707/724 |
| 2011/0282821 A1* | 11/2011 | Levy et al. | 706/47 |
| 2011/0288912 A1* | 11/2011 | Mccrea et al. | 705/14.2 |
| 2012/0015739 A1* | 1/2012 | Craine et al. | 463/42 |
| 2012/0030227 A1* | 2/2012 | Mital et al. | 707/767 |
| 2012/0041972 A1* | 2/2012 | Goldberg | 707/769 |
| 2012/0078953 A1* | 3/2012 | Araya | 707/769 |
| 2012/0094762 A1* | 4/2012 | Khan | 463/42 |
| 2012/0110464 A1* | 5/2012 | Chen et al. | 715/738 |
| 2012/0124482 A1* | 5/2012 | Ray et al. | 715/751 |
| 2012/0143677 A1* | 6/2012 | Bruno et al. | 705/14.46 |
| 2012/0159635 A1* | 6/2012 | He et al. | 726/26 |
| 2012/0180107 A1* | 7/2012 | Gammill et al. | 726/3 |
| 2012/0198358 A1* | 8/2012 | Carrer et al. | 715/753 |
| 2012/0233701 A1* | 9/2012 | Kidron | 726/26 |
| 2012/0239467 A1* | 9/2012 | Winters et al. | 705/14.1 |
| 2012/0239495 A1* | 9/2012 | Hu et al. | 705/14.49 |
| 2012/0239745 A1* | 9/2012 | Zuckerberg et al. | 709/204 |
| 2012/0278127 A1* | 11/2012 | Kirakosyan et al. | 705/7.29 |
| 2012/0296995 A1* | 11/2012 | Yan | 709/206 |
| 2012/0311036 A1* | 12/2012 | Huhn | 709/204 |
| 2013/0007449 A1* | 1/2013 | Rangsikitpho et al. | 713/168 |
| 2013/0179268 A1* | 7/2013 | Hu et al. | 705/14.66 |
| 2013/0318180 A1* | 11/2013 | Amin et al. | 709/206 |
| 2013/0325966 A1* | 12/2013 | Tseng, Erick | 709/204 |

OTHER PUBLICATIONS

Written Opinion for International application No. PCT/CN2011/077827, and English translation therefor, dated Nov. 3, 2011, total 8 pages.

Second office action issued in corresponding Chinese patent application 201180001170.6, dated Mar. 22, 2013, and English translation thereof, total 10 pages.

* cited by examiner

INFORMATION RECOMMENDATION METHOD, RECOMMENDATION ENGINE, NETWORK SYSTEM

CROSS-REFERENCE TO RELATED APPLICATIONS

This application is a continuation of International Application No. PCT/CN2011/077827, filed on Jul. 30, 2011, which is hereby incorporated by reference in their entireties.

FIELD OF THE INVENTION

The present invention relates to the field of information technologies, and in particular, to an information recommendation method, a recommendation engine, and a network system.

BACKGROUND OF THE INVENTION

The rapid development of Internet technologies brings the people into an information explosion age, which provides the people with rich information, and meanwhile greatly increases difficulty of a user finding information of interest, thereby causing an information overload problem. A recommendation technology is one of important methods for solving the information overload. A recommendation system generally refers to a system for providing personalized recommendation or instructing a user to find interesting and useful information in a personalized manner. The main problem is solved by replacing the user to evaluate products never seen by the user, where the products include a book, a film, a web page, a restaurant, music, a picture, and goods.

Currently, a statistic method is adopted to generate recommendation information, that is, statistics of all or a part of user behavior records in a database are gathered to obtain correlation between user behavior records to generate the recommendation information.

It can be seen that, in the prior art, the recommendation information generated based on the statistic method is less targeted to each individual user.

SUMMARY OF THE INVENTION

Embodiments of the present invention provide an information recommendation method, a device and a network system, where recommendation information is generated based on a social relationship, a behavior record of a friend of a user, and user behavior, and the generated recommendation information is more targeted, thereby improving user experience.

The embodiments of the present invention employ the following technical solutions.

An information recommendation method includes:

acquiring a friend list of a user from a data source with a social relationship;

acquiring a behavior record of a friend in the friend list of the user from a user behavior database;

generating recommendation information matched with current behavior of the user, according to the behavior record of the friend in the friend list of the user and information of the current behavior of the user; and sending the recommendation information to an application website.

A recommendation engine includes:

a friend list acquisition unit, configured to acquire a friend list of a user from a data source with a social relationship;

a friend behavior record acquisition unit, configured to acquire a behavior record of a friend in the friend list of the user from a user behavior database;

a recommendation information generation unit, configured to generate recommendation information matched with current behavior of the user, according to the behavior record of the friend in the friend list of the user and information of the current behavior of the user; and a recommendation information sending unit, configured to send the recommendation information to an application website.

A network system includes:

a recommendation engine, configured to: acquire a friend list of a user from a data source with a social relationship; acquire a behavior record of a friend in the friend list of the user from a user behavior database; generate recommendation information matched with current behavior of the user, according to the behavior record of the friend in the friend list of the user and information of the current behavior of the user; and send the recommendation information to an application website; and the data source with the social relationship, configured to receive a request message that is used for acquiring the friend list of the user and is sent by the recommendation engine, and send the friend list of the user to the recommendation engine.

Through the technical solutions, when information is recommended to the user, the recommendation information can be generated based on the social relationship and according to the behavior record of the friend of the user. The generated recommendation information is more targeted, thereby improving user experience.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention more comprehensible, the technical solutions according to embodiments of the present invention are clearly and completely described in the following with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

In the embodiments of the present invention, the called "data source with a social relationship" may be a social network, a micro blog, or an instant communication group, and the called application website may be a film website, a music website or the like.

Figure 1:
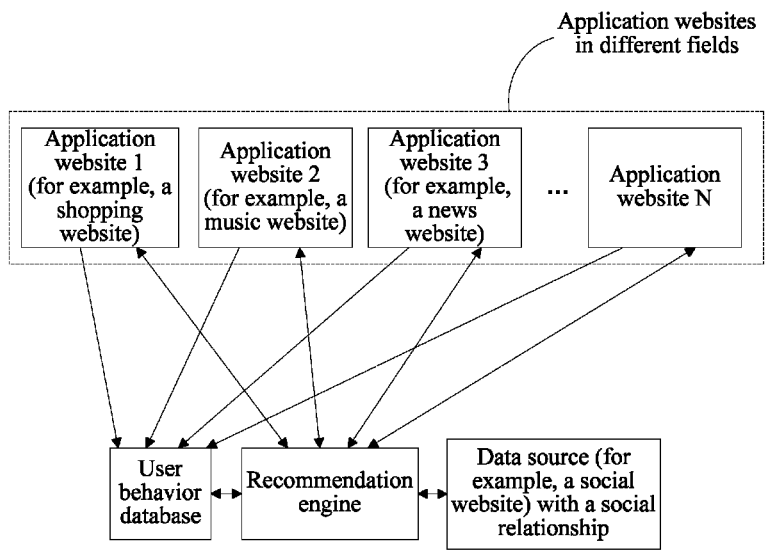
FIG. 1 is a schematic diagram of an embodiment of the present invention.

FIG. 1 is a schematic diagram of an embodiment of the present invention.

Referring to FIG. 1, application websites in different fields, such as a shopping application website, a music application website, and a news application website, provide services in different fields for users.

A user behavior database is configured to store user behavior information in applications of different fields. Specifically, user behavior refers to relevant user operations in an application website, such as browsing news, browsing goods information, auditioning music, downloading music, seeing a film, grading a film, and writing a review for a book.

The application websites in different fields can perform recommendation on the basis of more comprehensive and much richer user information by sharing user behavior information, so as to jointly improve recommendation quality. For example, the application websites in different fields can cooperate with each other to share user information through an application website alliance.

A recommendation engine is configured to acquire, according to social relationship information of a user (for example, a friend list of the user), behavior records of other users having a social relationship with the user, and analyze the behavior records to obtain a behavior record related to current behavior of the user to generate recommendation information.

A data source with a social relationship, for example, a social website, is configured to provide social relationship information of a user (for example, a friend list of the user). Specifically, the data source (for example, a social website) with the social relationship cooperates with the recommendation engine to make the social relationship information of the user public to the recommendation engine if allowable in user privacy setting.

Embodiment 1

Figure 2:
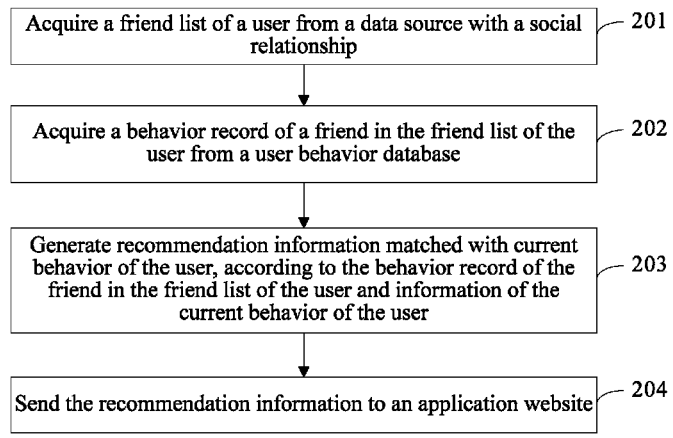
FIG. 2 is a flow chart of an information recommendation method provided by Embodiment 1 of the present invention.

An information recommendation method provided by an embodiment of the present invention is shown in FIG. 2 and includes the following steps.

201: Acquire a friend list of a user from a data source with a social relationship.

202: Acquire a behavior record of a friend in the friend list of the user from a user behavior database.

203: Generate recommendation information matched with current behavior of the user, according to the behavior record of the friend in the friend list of the user and information of the current behavior of the user.

204: Send the recommendation information to an application website.

Through the technical solution, when information is recommended to a user, the recommendation information can be generated based on the social relationship and according to the behavior record of the friend of the user. The recommendation information generated according to the behavior record of the friend of the user is more targeted, thereby improving user experience.

Embodiment 2

Figure 3:
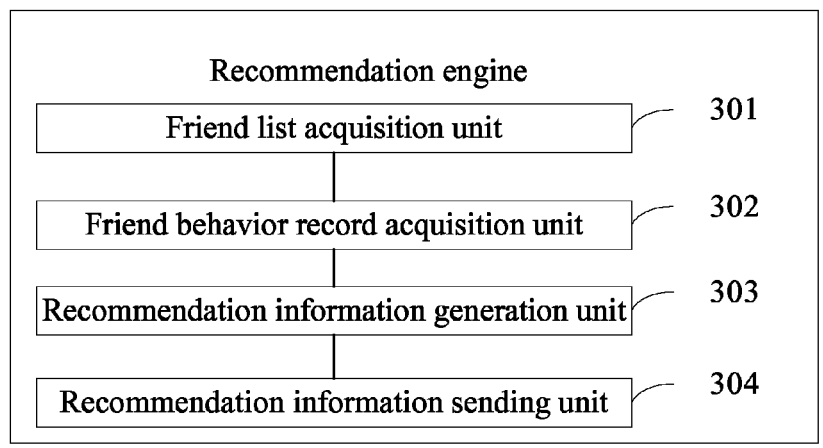
FIG. 3 is a structural diagram of a recommendation engine provided by Embodiment 2 of the present invention.

A specific form of a recommendation engine provided by an embodiment of the present invention may be a server or the like. As shown in FIG. 3, the recommendation engine includes a friend list acquisition unit 301, a friend behavior record acquisition unit 302, a recommendation information generation unit 303, and a recommendation information sending unit 304.

The friend list acquisition unit 301 is configured to acquire a friend list of a user from a data source with a social relationship. In this embodiment, the data source with the social relationship may specifically be a social website or the like.

The friend behavior record acquisition unit 302 is configured to acquire a behavior record of a friend in the friend list of the user from a user behavior database.

The recommendation information generation unit 303 is configured to generate recommendation information matched with current behavior of the user, according to the behavior record of the friend in the friend list of the user and information of the current behavior of the user.

The recommendation information sending unit 304 is configured to send the recommendation information to an application website.

Through the technical solution, when information is recommended to a user, the recommendation information can be generated based on the social relationship and according to the behavior record of the friend of the user. The recommendation information generated according to the behavior record of the friend of the user is more targeted, thereby improving user experience.

Embodiment 3

Figure 4:
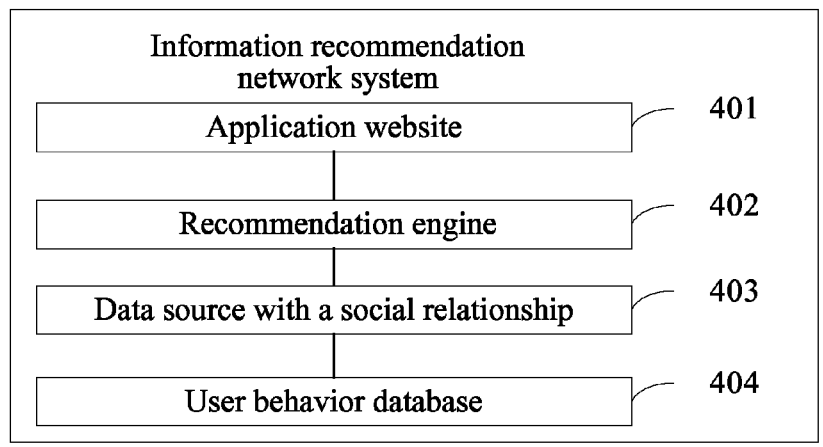
FIG. 4 is a structural diagram of a network system provided by Embodiment 3 of the present invention.

A network system provided by an embodiment of the present invention is shown in FIG. 4 and includes an application website 401, a recommendation engine 402, a data source with a social relationship 403, and a user behavior database 404.

The application website 401 is configured to send a request message used for acquiring recommendation information to the recommendation engine, then receive the recommendation information sent by the recommendation engine, and display the recommendation information to a user.

The recommendation engine 402 is configured to: acquire a friend list of a user from a data source with a social relationship; acquire a behavior record of a friend in the friend list of the user from a user behavior database; generate recommendation information matched with current behavior of the user, according to the behavior record of the friend in the friend list of the user and information of the current behavior of the user; and send the recommendation information to the application website.

The data source with the social relationship 403 is configured to receive a request message that is used for acquiring the friend list of the user and is sent by the recommendation engine, and send the friend list of the user to the recommendation engine. In this embodiment, the data source with the social relationship may specifically be a social website.

The user behavior database 404 is configured to receive request information that is used for acquiring the behavior record of the friend in the friend list of the user and is sent by the recommendation engine, send the behavior record of the friend in the friend list of the user to the recommendation engine, and store a user behavior record of the data source with the social relationship.

Specifically, the recommendation engine may be an independent entity, such as a server, or may be integrated into the application website. The user behavior database is an independent entity, such as a server.

Through the technical solution, when information is recommended to a user, the recommendation information can be generated based on the social relationship and according to the behavior record of the friend of the user. The recommendation information generated according to the behavior record of the friend of the user is more targeted, thereby improving user experience.

Embodiment 4

Figure 5:
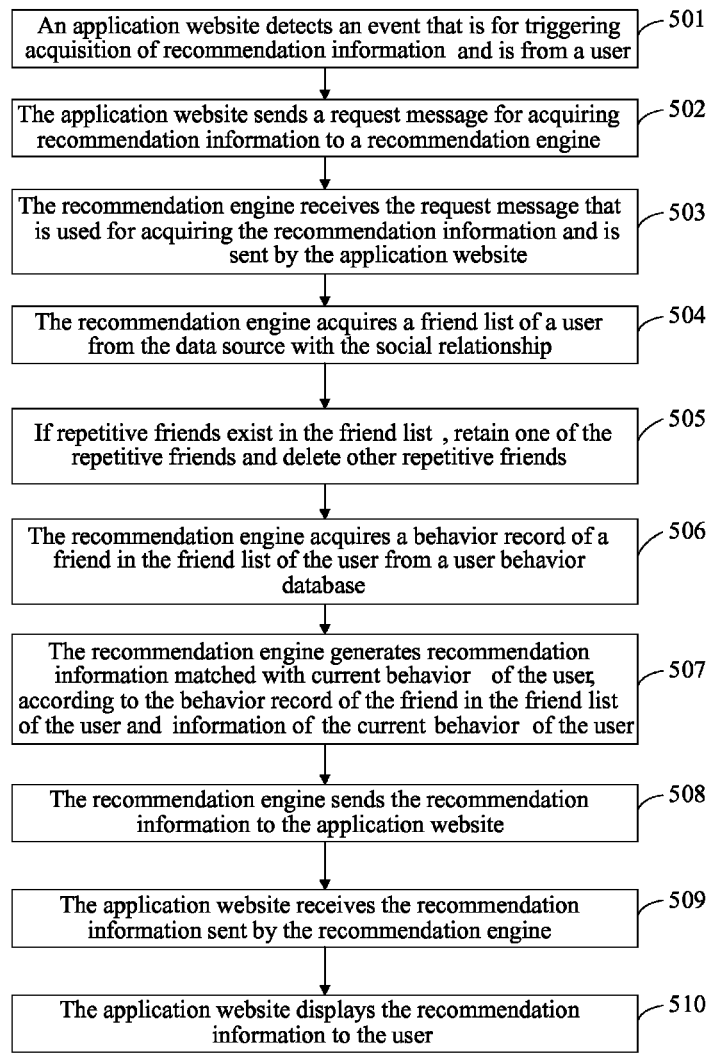
FIG. 5 is a flow chart of an information recommendation method provided by Embodiment 4 of the present invention.

In this embodiment, a data source with a social relationship may specifically be a social website or the like. As shown in FIG. 5, an information recommendation method provided by an embodiment of the present invention includes the following steps.

501: An application website detects an event that is for triggering acquisition of recommendation information and is from a user.

Specifically, the event for triggering the acquisition of the recommendation information from the user includes: logging in to the application website by the user and browsing information by the user.

502: The application website sends a request message used for acquiring the recommendation information to a recommendation engine.

Specifically, the request message carries information of current behavior of the user and an identity authentication message of the user on at least one social website. The information of the current behavior of the user.

Furthermore, in order to identify the same user in different application websites through a unique identity to associate behavior records of the user in applications in different fields with each other, the recommendation engine uses a passport of the user in the data source (for example, a social website) with the social relationship as a passport of the recommendation engine, that is, the user uses a service, which is provided by an application in each field, through an account and a password of a social network.

Furthermore, when registering with an application (for example, a website) in each field, a new user needs to provide his/her account in a data source (for example, a social website) with a social relationship, and an identity of the user is needed to be authenticated through the data source (for example, the social website) with the social relationship to determine whether the user is an owner of the account in the data source (for example, the social website) with the social relationship. In addition, if the recommendation engine cooperates with multiple data sources (for example, social websites) with social relationships, the user can bind accounts in the multiple data sources (for example, the social websites) with the social relationships to the applications (for example, websites) in fields. Account association information of a user in a data source (for example, the social website) with a social relationship in a database is shown in the following table.

| User ids | Names of Social Websites | Accounts |
|---|---|---|
| 0001 | xxx | xxx@xxx |
| 0001 | xxx | xxx@xxx |
| 0002 | xxx | xxx@xxx |
| 0003 | xxx | xxx@xxx |
| 0003 | xxx | xxx@xxx |
| 0003 | xxx | xxx@xxx |
| 0004 | xxx | xxx@xxx |
| 0004 | xxx | xxx@xxx |
| ... | ... | ... |

The user id is a background identity allocated to a user by the recommendation engine.

Specifically, the request carries a user account in the data source (for example, the social website) with the social relationship and the information of the current behavior of the user, and there may be one or more user accounts in the data source (for example, the social website) with the social relationship.

Furthermore, the user can select that accounts in which data sources (for example, the social websites) with the social relationships are carried in the request, that is, it indicates that the user follows relevant friend behavior information in which data sources (for example, the social websites) with the social relationships.

503: The recommendation engine receives the request message that is used for acquiring the recommendation information and is sent by the application website, where the request message carries the information of the current behavior of the user.

Specifically, after the recommendation engine receives the request message that is used for acquiring the recommendation information and is sent by the application website, the procedure proceeds to 504.

504: The recommendation engine acquires a friend list of the user from the data source with the social relationship.

Specifically, the acquiring, by the recommendation engine, the friend list of the user from the data source (for example, the social website) with the social relationship includes:

sending, by the recommendation engine, a request message used for acquiring the friend list of the user to at least one data source (for example, the social website) with the social relationship, where the request message carries identity authentication information of the user on the at least one social website; and receiving, by the recommendation engine, the friend list of the user returned by the at least one data source (for example, the social website) with the social relationship.

Furthermore, if the recommendation engine cooperates with multiple data sources (for example, the social websites) with the social relationships, and the user binds its own identity authentication information in the multiple data sources (for example, the social websites) with the social relationships, the recommendation engine sends a request message used for acquiring the friend list of the user to each of the multiple data sources (for example, the social websites) with the social relationships.

Specifically, the received friend list of the user includes an account of a friend in a data source (for example, a social website) with a social relationship, where the friend has a social relationship with the user.

Furthermore, the friend of the user can set privacy in the data source (for example, the social website) with the social relationship, and the data source (for example, the social website) with the social relationship needs to provide the friend list of the user if allowable in the privacy setting of the friend of the user. For example, if in the data source (for example, the social website) with the social relationship, the friend of the user is set to be excluded from a friend list, the friend who is set to be excluded from the friend list is not included in a generated friend list.

Furthermore, the recommendation engine can save the friend list of the user, and in the case of a small interval between successive requests of the user, can directly use the saved friend list, and unnecessarily requests a friend list from the data source (for example, the social website) with the social relationship each time.

It should be noted that, the acquiring, by the recommendation engine, the friend list of the user from the data source (for example, the social website) with the social relationship further includes:

after subscribing, by the user, to the friend list of the user, receiving, by the recommendation engine, a notification on change of the friend list of the user when the friend list of the user is changed, where the notification is actively sent by the data source (for example, the social website) with the social relationship; and updating, by the recommendation engine, the originally saved friend list of the user according to the notification on the change.

Specifically, if the data source (for example, the social website) with the social relationship supports the subscription of social relationship information of the user, the recommendation engine can subscribe to social relationship information of the user from the data source (for example, the social website) with the social relationship. Once a friend list of the user on the data source (for example, the social website) with the social relationship is changed, the recommendation engine may receive a corresponding notification to update the locally saved social relationship information of the user, that is, in this way, the friend list of the user saved in the recommendation engine is the same as the friend list of the user in the data source (for example, the social website) with the social relationship.

Furthermore, the method further includes the following steps.

505: If repetitive friends exist in the friend list, retain one of the repetitive friends and delete other repetitive friends.

Specifically, it may be checked whether repetitive friend accounts exist in one or more friend lists; if the repetitive friend accounts exist, one of the repetitive friend accounts is retained and the rest is deleted.

506: The recommendation engine acquires a behavior record of a friend in the friend list of the user from a user behavior database.

The acquiring, by the recommendation engine, the behavior record of the friend in the friend list of the user from the user behavior database is specifically:

sending, by the recommendation engine, request information used for acquiring the behavior record of the friend in the friend list of the user to the user behavior database, where the request information carries an account of the friend of the user; and receiving, by the recommendation engine, the behavior record of the friend in the friend list of the user, where the behavior record is returned by the user behavior database.

Specifically, a user behavior record that is in the data source (for example, the social website) with the social relationship and is stored in the user behavior database includes: a user id, an account in the data source (for example, the social website) with the social relationship, an application field, an application name, behavior occurrence time, an item name (including a film name, a song name, a news title, and a goods name), an item label (including a film class, a singer of a song, and a news keyword), a relevant link (including a film introduction page link), a user action (including browsing, seeing and hearing, downloading, reviewing, and purchasing) in the data source (for example, the social website) with the social relationship, user feedback (including grading an item and reviewing the item) in the data source (for example, the social website) with the social relationship, and a link of user feedback information (including a book review and a film review).

Furthermore, the user behavior record in the user behavior database is provided by the application website, where the user account in the data source (for example, the social website) with the social relationship, the behavior occurrence time, the item name, the item label, and the user action are information that must be provided. If the behavior record provided by the application website cannot satisfy the requirement, the behavior record cannot be saved in the user behavior database.

Furthermore, according to the account of the friend of the user carried in the request message sent by the recommendation engine, the user behavior database finds a behavior record corresponding to the account of the friend of the user, and generates return information which carries the found behavior record corresponding to the account of the friend of the user in the return information.

Furthermore, the user can set privacy in the application website, that is, select which behavior information to be made public, for example, behavior information in which application websites is made public, which behavior information in a certain application website is made public (for example, only behavior for performing item feedback is made public, only behavior related to which class of film is made public), and which behavior records are made public to which friends.

507: The recommendation engine generates recommendation information matched with current behavior of the user, according to the behavior record of the friend in the friend list of the user and the information of the current behavior of the user.

Specifically, a target friend behavior record matched with a current behavior record of the user is selected from the behavior records of friends in the friend list of the user, and the recommendation information is generated by using the target friend behavior record.

Furthermore, the content of the information of the current behavior of the user includes user behavior occurrence time, a user behavior item name, and a user behavior item label.

Specifically, the recommendation engine analyzes the correlation between the friend behavior record and the current behavior of the user in a manner of item name keyword matching or item label matching, to select a friend behavior record related to the current behavior of the user, that is, generate the recommendation information.

Moreover, the recommendation engine may generate recommendation information satisfying a condition set by the user, where the condition set by the user includes: the user sets that a behavior record of a specific friend is preferably generated; and the user sets friend behavior records in a specific period of time.

The user can set in the application website that only a part of user behavior records is made public.

508: The recommendation engine sends the recommendation information to the application website.

509: The application website receives the recommendation information sent by the recommendation engine.

Furthermore, after the recommendation information is received, 510 is performed.

510: The application website displays the recommendation information to the user.

Through the technical solution, when information is recommended to the user, the recommendation information in multiple fields is generated according to the behavior record of the friend of the user, and the recommendation information can be generated according to the behavior record of the friend of the user, so the generated recommendation information is richer, so that according to the friend behavior record, the user can select information that is to be selected.

Based on the information recommendation method provided by this embodiment, the following is an embodiment in which this method is applied in a specific scenario. In this embodiment, the data source with the social relationship is the Facebook website, the application website is a film website.

The application scenario of this embodiment is as follows: a user A browses relevant information of the film "Harry Potter" on a film website, the film website already participates in a field application alliance in a recommendation engine, the recommendation engine acquires a friend list of the user through the Facebook, and the user A provides his/her account xxx in the Facebook.

Specifically, when the user A browses the relevant information of the film, reviews about the film made by friends, who have seen the film, in Facebook friends of the user A and their other behavior records related to the film are shown on a page, where other behavior records include which relevant television dramas or other films have been seen, which relevant books are purchased, which relevant music are listened to, and which relevant news is browsed. In addition, the user may also reset a period of time of relevant friend behavior records. After the resetting, relevant friend behavior records in the new period of time are shown on the page.

Figure 6:
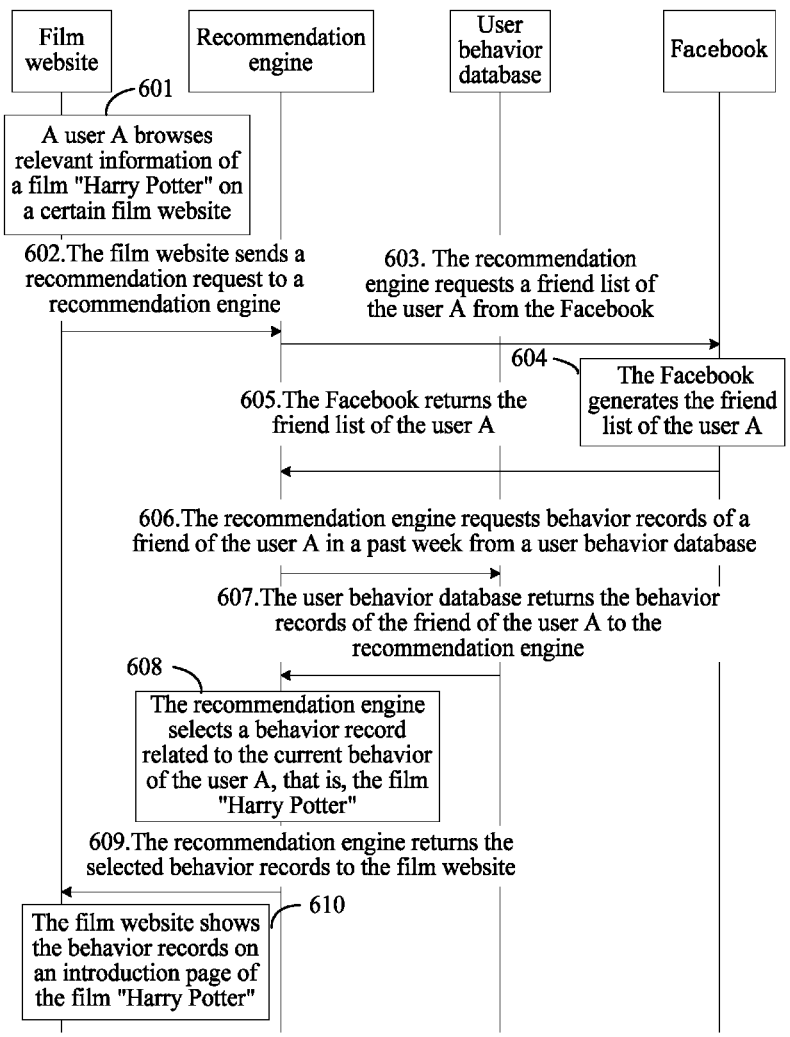
FIG. 6 is a schematic diagram of an application example of the information recommendation method provided by Embodiment 4 of the present invention.

FIG. 6 is a schematic diagram of this embodiment. Referring to FIG. 6, the method includes the following steps.

601: The user A browses relevant information of the film "Harry Potter" on a certain film website.

602: The film website sends a recommendation request to a recommendation engine, where the request carries a Facebook identity of the user A and information of current behavior of the user A, that is, browsing the information of the film "Harry Potter".

603: The recommendation engine requests a friend list of the user A from the Facebook, where the request carries the Facebook identity of the user A.

604: The Facebook generates the friend list of the user A.

Specifically, the social website Facebook determines that the friend relationship of the user A can be made public through a series of operations, such as user privacy setting and authentication and the right authentication of the recommendation engine, and provides the friend list of the user A to the recommendation engine, where the friend list includes a Facebook identity of a friend.

605: The Facebook returns the friend list of the user A.

606: The recommendation engine requests behavior records of a friend of the user A in a past week from a user behavior database.

Specifically, the user can set behavior record time, such as a past month or a past week. If the user does not set the time, the recommendation engine acquires behavior information at a certain interval by default. In this embodiment, the past week is adopted.

Furthermore, the user can select information from the friend list, and the recommendation engine only needs to acquire behavior information of a part of friends.

607: The user behavior database returns the friend behavior records of the user A to the recommendation engine.

Furthermore, if the friend of the user A sets whether to make its own behavior information public and how to make its own behavior information public, only information set to be public can be provided for the recommendation engine.

Specifically, the friend behavior information returned to the recommendation engine is shown in the following table.

| Accounts | Application Fields | Application Names | Time | Item Names | Item Labels | Relevant Links | Action | Feedback | Feedback Links |
|---|---|---|---|---|---|---|---|---|---|
| B | Film | xxx | 2010-12-11 15:23 | Harry Potter | Harry Potter, J. K. Rowling, Daniel Radcliffe, science fiction | url1 | See | Good! The story is attractive. | url11 |
| B | Film | xxx | 2010-12-10 17:01 | Transformers | Shia Labeouf, Megan Fox, John Turturro, Jon Voight, Michael Bay, action/science fiction/adventure | url2 | See | None | None |
| B | Video | xxx | 2010-12-09 12:00 | Avatar | James Cameron, 3D | url3 | See | None | None |
| B | Video | xxx | 2010-12-09 20:01 | Friends | Kevin S. Bright, Friends | url4 | Browse | None | None |
| B | Book | xxx | 2010-12-06 12:10 | Make A World of Difference | Kai fu Lee, biography, inspiration, growth | url5 | Download | None | None |
| B | Music | xxx | 2010-12-06 14:01 | Theme song of "Harry Potter" | Harry Potter | url6 | Audition | None | None |
| B | Music | xxx | 2010-12-06 23:00 | Lute music | Melodious, Lute | url7 | Download | Very good | url7 |
| B | News | xxx | 2010-12-05 9:07 | Deng Chao becomes a new favorite in the screen due to "Di Renjie". | Deng Chao, Di Renjie, white hair, amazing detective | url8 | Browse | Deng Chao acts very well! | url8 |

-continued

| Accounts | Application Fields | Application Names | Time | Item Names | Item Labels | Relevant Links | Action | Feedback | Feedback Links |
|---|---|---|---|---|---|---|---|---|---|
| B | Shopping | xxx | 2010-12-06 12:23 | Sway bell | Baby toy | url9 | Purchase | Good quality | url9 |
| C | Film | xxx | 2010-12-11 12:10 | Mysterious Island | Horror, thriller, heart transplantation | url10 | See | None | None |
| C | Film | xxx | 2010-12-11 18:01 | Inception | Suspense, dream, through time and space, Leonardo | url11 | See | Good | url11 |
| C | Film | xxx | 2010-12-11 20:22 | Harry Potter | Harry Potter, J. K. Rowling, Daniel Radcliffe, science fiction | url12 | See | Four-star rating | Wonderful |
| C | Book | xxx | 2010-12-09 08:01 | Old Man and Sea | Hemingway | url13 | Purchase | None | None |
| C | Book | xxx | 2010-12-09 19:22 | Twilight Saga | vampire, love | url14 | Purchase | None | None |
| C | Book | xxx | 2010-12-08 20:00 | Are You Happy? | Bai Yansong, comprehension | url15 | Browse | None | None |
| C | Shopping | xxx | 2010-12-08 21:08 | Wok | Supor | url16 | Purchase | easy to use | url16 |
| C | Shopping | xxx | 2010-12-06 23:00 | Movie ticket | National Theatre | url17 | Browse | None | None |
| D | Film | xxx | 2010-12-11 21:00 | Shutter Island | Suspense, psychopath, Leonardo | url18 | Download | The acting skill of Leonardo is great. | url18 |
| D | Music | xxx | 2010-12-08 12:09 | Smiling Eyes | Vivian Xu, love song, sentimental | url19 | Download | One of my favorite songs | url19 |
| D | Music | xxx | 2010-12-07 14:46 | Moon River | Breakfast at Tiffany's, Truman Capote, Blake Edwards, love film | url20 | Audition | intriguing film theme song | url20 |
| ... | ... | ... | ... | ... | ... | ... | ... | ... | ... |

608: The recommendation engine selects a behavior record related to the current behavior of the user A, that is, reviewing the film "Harry Potter". The recommendation engine analyzes the behavior record of the friend of the user A in the table.

Specifically, the recommendation engine can perform selection in a manner of item name keyword matching or item label matching or the like. For example, matching is performed according to a keyword "Rowling" or "science fiction" to find the behavior records related to the film.

609: The recommendation engine returns the selected behavior records to the film website.

610: The film website shows the behavior records on an introduction page of the film "Harry Potter".

Furthermore, the user A may set degrees of being close to friends, and the recommendation engine preferably displays relevant behavior information of a friend most close to the user A.

Particularly, after the user sees relevant friend behavior records in a past week, the user may consider that the information is too much or too little, so the user may reset a period of time during which the behavior records exist, to obtain a corresponding result, that is, perform the following steps.

The user A resets a time interval to be a past month. The recommendation engine acquires friend behavior records in the past month from a user database, then performs selection for the behavior records to obtain a part related to the current behavior of the user, provides the part to a film website, and displays an updated result to the user A on the web page.

Through the technical solution, when information is recommended to the user, the recommendation information can be generated based on the social relationship and according to the behavior record of the friend of the user. The recommendation information generated according to the behavior record of the friend of the user is more targeted, thereby improving user experience.

Embodiment 5

Figure 7:
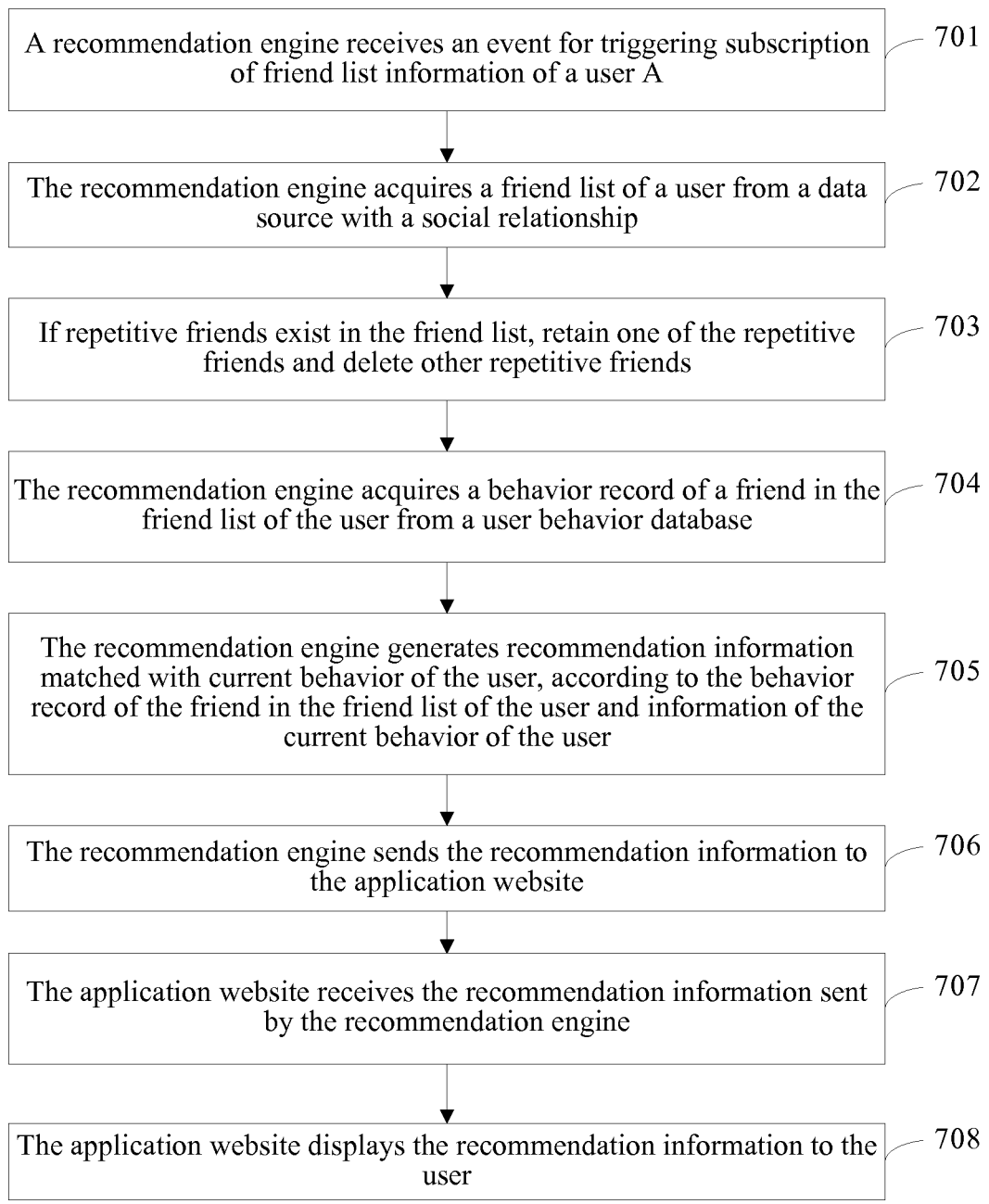
FIG. 7 is a flow chart of an information recommendation method provided by Embodiment 5 of the present invention.

An information recommendation method provided by an embodiment of the present invention is shown in FIG. 7 and includes the following steps.

701: A recommendation engine receives an event for triggering subscription of friend list information of a user A. For example, a user subscribes to a friend list of a user.

702: The recommendation engine acquires a friend list of a user from a data source with a social relationship, where the data source with the social relationship may be a social website, for example, Facebook.

Specifically, reference is made to 504 in Embodiment 4.

703: If repetitive friends exist in the friend list, retain one of the repetitive friends and delete other repetitive friends.

Specifically, reference is made to 505 in Embodiment 4.

704: The recommendation engine acquires a behavior record of a friend in the friend list of the user from a user behavior database.

Specifically, reference is made to 506 in Embodiment 4.

705: The recommendation engine generates recommendation information matched with current behavior of the user, according to the behavior record of the friend in the friend list of the user and information of the current behavior of the user.

Specifically, reference is made to 507 in Embodiment 4.

706: The recommendation engine sends the recommendation information to the application website.

Specifically, reference is made to 508 in Embodiment 4.

707: The application website receives the recommendation information sent by the recommendation engine.

Specifically, reference is made to 509 in Embodiment 4.

708: The application website displays the recommendation information to the user.

Specifically, reference is made to 510 in Embodiment 4.

Through the technical solution, when information is recommended to the user, recommendation information in multiple fields is generated according to the behavior record of the friend of the user, and the recommendation information can be generated according to the behavior record of the friend of the user, so the generated recommendation information is richer. Moreover, when information is recommended to the user, recommendation information in multiple fields is generated based on the social relationship and according to the behavior record of the friend of the user, and the recommendation information can be generated according to the behavior record of the friend of the user, so the generated recommendation information is more targeted, thereby enhancing user experience.

Based on the information recommendation method provided by this embodiment, the following is an example where this method is applied in a specific scenario.

Figure 8A:
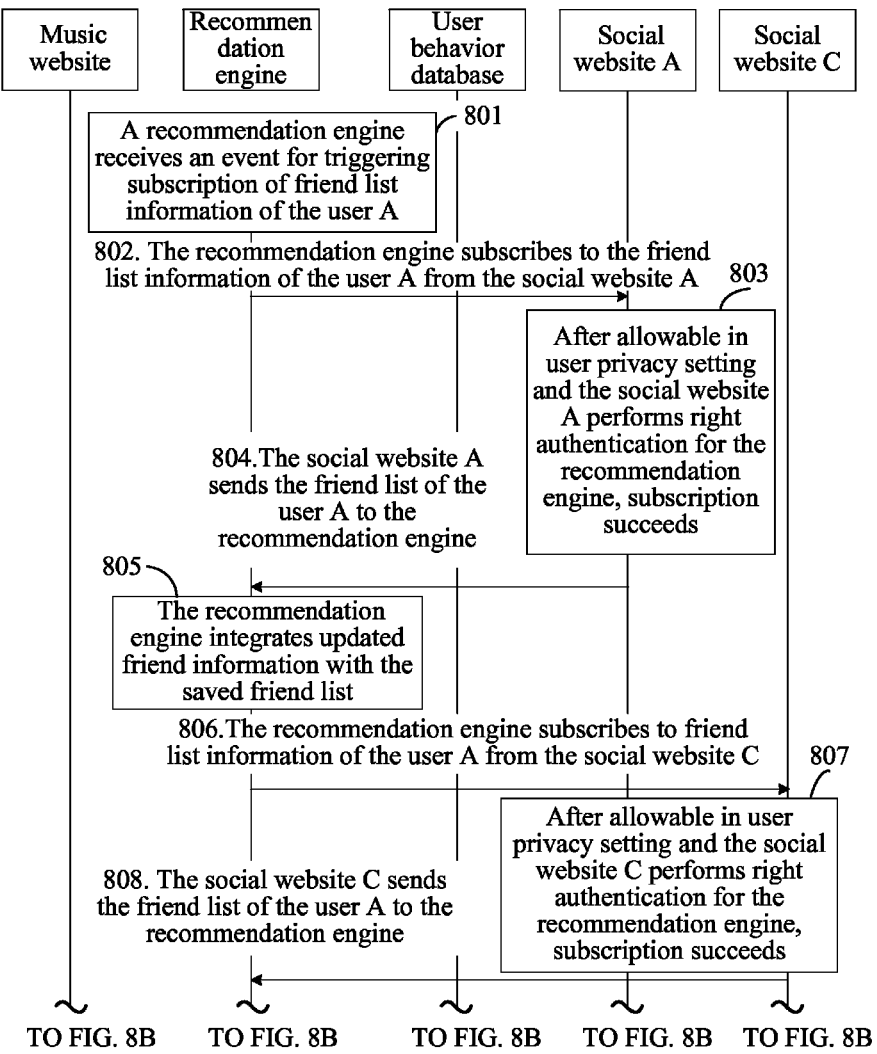
FIGS. 8A and 8B is a schematic diagram of an application example of the information recommendation method provided by Embodiment 5 of the present invention.
Figure 8B:
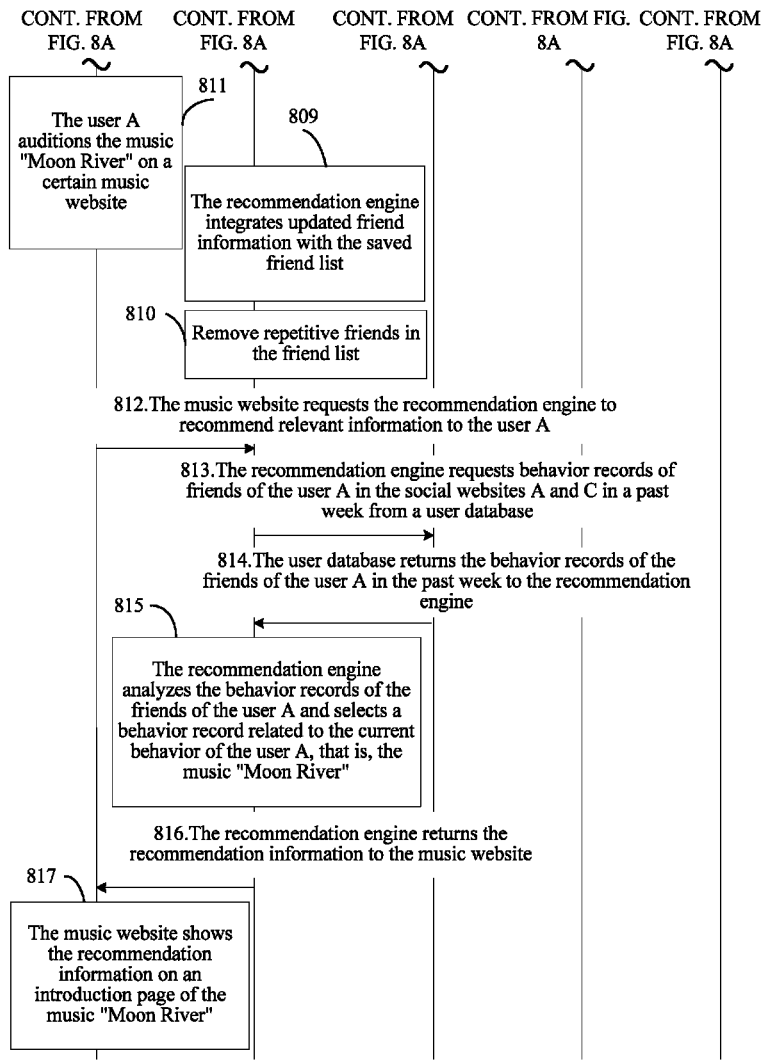

Referring to FIG. 8, an application scenario of this embodiment is as follows: the recommendation engine cooperates with multiple data sources with social relationships. In this embodiment, a social website A, a social website B, and a social website C are data sources with social relationships, and a user A provides her/his accounts in the social website A and the social website C. The user A auditions music "Moon River" on a certain music website, and the recommendation engine shows relevant behavior records of friends in two friend lists.

801: A recommendation engine receives an event for triggering subscription of friend list information of the user A. For example, the user subscribes to the friend list of the user from the social website, and the recommendation engine recommends information to the user A for the first time.

802: The recommendation engine subscribes to the friend list information of the user A from the social website A.

Specifically, the subscription request carries an account of the user A in the social website A.

803: After allowable in user privacy setting and the social website A performs right authentication for the recommendation engine, subscription succeeds, and once the friend list of the user A is changed, the social website A notifies the update to the recommendation engine.

804: The social website A sends the friend list of the user A to the recommendation engine.

Specifically, once the friend list of the user A is changed, the social website A notifies the update to the recommendation engine.

805: The recommendation engine integrates updated friend information with a saved friend list.

806: The recommendation engine subscribes to friend list information of the user A from the social website C.

Specifically, the subscription request carries an account of the user A in the social website C.

807: After allowable in user privacy setting and the social website C performs right authentication for the recommendation engine, subscription succeeds, and once the friend list of the user A is changed, the social website C notifies the update to the recommendation engine.

808: The social website C sends the friend list of the user A to the recommendation engine.

Specifically, once the friend list of the user A is changed, the social website C notifies the update to the recommendation engine.

809: The recommendation engine integrates updated friend information with a saved friend list.

It should be noted that, the order of 802, 803, 804, and 805 and the order of 806, 807, 808, and 809 are not distinguished and limited, and can be adjusted according to actual requirements. In this embodiment, the order of 802 to 805 is adopted.

810: Remove repetitive friends in the friend list.

Specifically, if repetitive friends exist in the friend list of the user in the social website A and the friend list of the user in the social website C, one of the repetitive friends is retained and the rest is deleted.

811: The user A auditions the music "Moon River" on a certain music website.

812: The music website requests the recommendation engine to recommend relevant information to the user A.

Specifically, the request carries accounts of the user A in the social websites A and C, and current behavior of the user A, that is, auditioning "Moon River".

813: The recommendation engine requests behavior records of friends of the user A in the social websites A and C in a past week from a user database.

Specifically, the friend list carried in the request is friend information locally saved in the recommendation engine.

814: The user database returns the behavior records of the friends of the user A in the past week to the recommendation engine.

Specifically, after the user sees the relevant behavior records of the friends in the past week, the user may consider that the information is too much or too little, so the user may reset the period of time during which the behavior records exist, to obtain a corresponding result, that is, to perform the following steps.

The user A resets a time interval to be a past month. The recommendation engine acquires the behavior records of friends in the past month from the user database, then performs selection for the behavior records to obtain a part related to the current behavior of the user, provides the part to a film website, and displays an update result to the user A on a web page.

815: The recommendation engine analyzes the behavior records of the friends of the user A and selects a behavior record related to the current behavior of the user A, that is, the behavior record related to the music "Moon River".

Specifically, the recommendation engine can perform selection in a manner of item name keyword matching or item label matching or the like. For example, matching is performed according to a keyword "Spirited Away" or "Miyazaki Hayao" to find a behavior record related to the music.

816: The recommendation engine returns the recommendation information to the music website.

817: The music website shows the recommendation information on an introduction page of the music "Moon River".

Through the technical solution, when information is recommended to the user, the recommendation information can be generated based on the social relationship and according to the behavior record of the friend of the user. The recommendation information generated according to the behavior record of the friend of the user is more targeted, thereby improving user experience.

Embodiment 6

Figure 9:
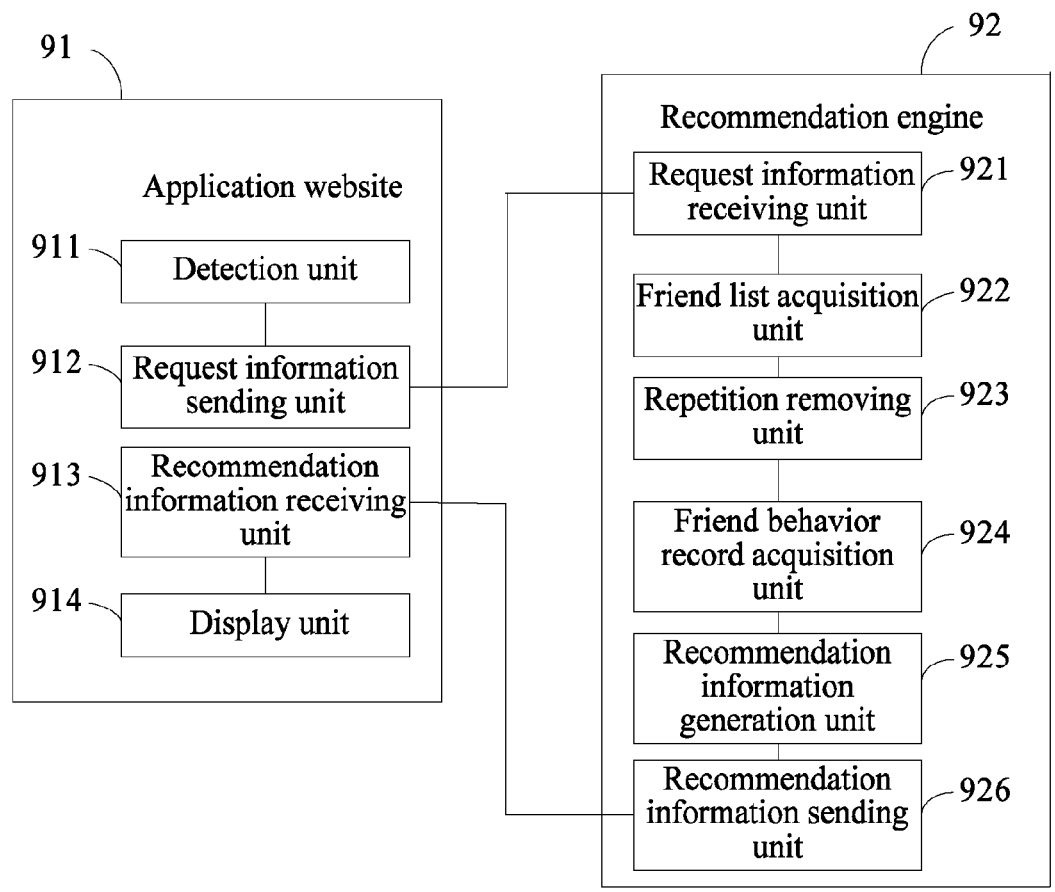
FIG. 9 is a structural diagram of a network system provided by Embodiment 6 of the present invention.

A network system provided by an embodiment of the present invention is shown in FIG. 9 and includes an application website 91 and a recommendation engine 92. The application website 91 may include a detection unit 911, a request information sending unit 912, a recommendation information receiving unit 913, and a display unit 914. The recommendation engine 92 may include a request information receiving unit 921, a friend list acquisition unit 922, a repetition removing unit 923, a friend behavior record acquisition unit 924, a recommendation information generation unit 925, and a recommendation information sending unit 926. In this embodiment, the recommendation engine may be one or more servers. The unit in the recommendation engine may be a processor or an Application Specific Integrated circuit. The application website in this embodiment may be a music website or a film website or the like.

Referring to FIG. 9, the detection unit 911 is configured to detect an event that is for triggering acquisition of recommendation information and is from a user.

Specifically, the event that is for triggering the acquisition of the recommendation information and is from the user includes: logging in to an application website by the user and browsing information by the user.

The request information sending unit 912 is configured to send a request message used for acquiring the recommendation information to the recommendation engine.

Specifically, the request message carries information of current behavior of the user, an identity authentication message of the user on at least one data source (for example, a social website) with a social relationship. Content of the information of the current behavior of the user includes user behavior occurrence time, a user behavior item name, and a user behavior item label.

Furthermore, in order to identify the same user in different application websites through a unique identity to associate behavior records of the user in applications in different fields with each other, the recommendation engine uses a passport of the user in the data source (for example, the social website) with the social relationship as a passport of the recommendation engine, that is, the user uses a service, which is provided by an application in each field, through an account and a password in the data source (for example, the social website) with the social relationship.

Furthermore, when registering with an application website in each field, a new user needs to provide his/her account in a data source with a social relationship, and an identity of the user is needed to be authenticated through the data source with the social relationship to determine whether the user is an owner of the account in the data source with the social relationship. In addition, if the recommendation engine cooperates with multiple data sources with social relationships, the user can bind accounts in the multiple data sources with the social relationships to the user itself. Account association information of a user in a data source with a social relationship is shown in the following table.

| User ids | Names of Social Websites | Accounts |
| --- | --- | --- |
| 0001 | xxx | xxx@xxx |
| 0001 | xxx | xxx@xxx |

-continued

| User ids | Names of Social Websites | Accounts |
| --- | --- | --- |
| 0002 | xxx | xxx@xxx |
| 0003 | xxx | xxx@xxx |
| 0003 | xxx | xxx@xxx |
| 0003 | xxx | xxx@xxx |
| 0004 | xxx | xxx@xxx |
| 0004 | xxx | xxx@xxx |
| ... | ... | ... |

The user id is a background identity allocated to a user by the recommendation engine.

Specifically, the request carries a user account in the data source with the social relationship and the information of the current behavior of the user, and there may be one or more user accounts in the data sources with the social relationships.

Furthermore, the user can select that accounts in which data sources with the social relationships are carried in the request, that is, it indicates that the user follows relevant friend behavior information in which data sources with the social relationships.

The request information receiving unit 921 is configured to receive the request message that is used for acquiring the recommendation information and is sent by the application website, where the request message carries the information of the current behavior of the user.

The friend list acquisition unit 922 is configured to acquire a friend list of the user from a data source with a social relationship.

Specifically, the friend list acquisition unit 922 may include the following modules:

a friend list request message sending module, configured to send a request message used for acquiring a friend list of the user to at least one data source with the social relationship, where the request message carries identity authentication information of the user in the at least one data source with the social relationship;

a friend list receiving module, configured to receive the friend list of the user returned by the at least one data source with the social relationship; and a change notification receiving module, configured to receive a notification on change of the friend list of the user when the friend list of the user is changed, where the notification is actively sent by the at least one data source with the social relationship; and update the friend list of the user according to the notification on the change.

In this embodiment, the data source with the social relationship may be a social website.

Furthermore, if the recommendation engine cooperates with multiple data sources (for example, the social websites) with social relationships, and the user binds its own identity authentication information in the multiple data sources (for example, the social websites) with the social relationships, the recommendation engine sends a request message used for acquiring the friend list of the user to each of the multiple data sources (for example, the social websites) with the social relationships.

Specifically, the received friend list of the user may include an account of a friend in a data source (for example, a social website) with a social relationship, where the friend has a social relationship with the user.

Furthermore, the friend of the user can set privacy in the data source (for example, the social website) with the social relationship, and the data source (for example, the social website) with the social relationship needs to provide the friend list of the user if allowable in the privacy setting of the friend of the user. For example, if in the data source (for example, the social website) with the social relationship, the friend of the user is set to be excluded from a friend list, the friend who is set to be excluded from the friend list is not included in a generated friend list.

Furthermore, the recommendation engine can save the friend list of the user, and in the case of a small interval between successive requests of the user, can directly use the saved friend list, and unnecessarily requests a friend list from the data source (for example, the social website) with the social relationship each time.

It should be noted that, the friend list acquisition unit 922 may further include:

a change notification receiving module, configured to receive a notification on change of the friend list of the user when the friend list of the user is changed, where the notification is actively sent by at least one data source (for example, the social website) with the social relationship; and update the originally saved friend list of the user according to the notification on the change.

Specifically, after the user subscribes to automatically acquiring the friend list of the user, the recommendation engine receives the notification on change of the friend list of the user when the friend list of the user is changed, where the notification is actively sent by the data source (for example, the social website) with the social relationship; and the recommendation engine updates the originally saved friend list of the user according to the notification on the change.

Specifically, if the data source (for example, the social website) with the social relationship supports the subscription of social relationship information of the user, the recommendation engine can subscribe to social relationship information of the user from the data source (for example, the social website) with the social relationship. Once a friend list of the user on the data source (for example, the social website) with the social relationship is changed, the recommendation engine may receive a corresponding notification to update the locally saved social relationship information of the user, that is, in this way, the friend list of the user saved in the recommendation engine is the same as the friend list of the user in the data source (for example, the social website) with the social relationship.

Furthermore, the system further includes the following units.

The repetition removing unit 923 is configured to, when repetitive friends exist in the friend list, retain one of the repetitive friends and delete other repetitive friends.

Specifically, it may be checked whether repetitive friend accounts exist in one or more friend lists; if the repetitive friend accounts exist, one of the repetitive friend accounts is retained and the rest is deleted.

The friend behavior record acquisition unit 924 is configured to acquire a behavior record of a friend in the friend list of the user from a user behavior database.

Specifically, the friend behavior record acquisition unit 924 may include:

a behavior record acquisition request sending module, configured to send request information used for acquiring the behavior record of the friend in the friend list of the user to the user behavior database, where the request information carries an account of the friend of the user; and a behavior record receiving module, configured to receive the behavior record of the friend in the friend list of the user, where the behavior record is returned by the user behavior database.

Specifically, a user behavior record that is in the data source (for example, the social website) with the social relationship and is stored in the user behavior database may include: a user id, an account in the data source (for example, the social website) with the social relationship, an application field, an application name, behavior occurrence time, an item name (including a film name, a song name, a news title, and a goods name), an item label (including a film class, a singer of a song, and a news keyword), a relevant link (including a film introduction page link), a user action (including browsing, seeing and hearing, downloading, reviewing, and purchasing) in the data source (for example, the social website) with the social relationship, user feedback (including grading an item and reviewing the item) in the data source (for example, the social website) with the social relationship, and a link of user feedback information (including a book review and a film review).

Furthermore, the user behavior record in the user behavior database is provided by the application website, where the user account in the data source (for example, the social website) with the social relationship, the behavior occurrence time, the item name, the item label, and the user action are information that must be provided. If the behavior record provided by the application website cannot satisfy the requirement, the behavior record cannot be saved in the user behavior database.

Furthermore, according to the account of the friend of the user carried in the request message sent by the recommendation engine, the user behavior database finds a behavior record corresponding to an account of the friend of the user, and generates return information which carries the found behavior record corresponding to the account of the friend of the user in the return information.

Furthermore, the user can set privacy in the application website, that is, select which behavior information to be made public, for example, behavior information in which application websites is made public, which behavior information in a certain application website is made public (for example, only behavior for performing item feedback is made public, only behavior related to which class of film is made public), and which behavior records are made public to which friends.

The recommendation information generation unit 925 is configured to generate recommendation information matched with current behavior of the user, according to the behavior record of the friend in the friend list of the user and information of the current behavior of the user.

Specifically, the recommendation information generation unit 925 may specifically be configured to:

select a target friend behavior record, which is matched with a current behavior record of the user, from the behavior records of the friends in the friend list of the user, and generate the recommendation information by using the target friend behavior record.

Furthermore, the information of the current behavior of the user may at least include a user account in the data source (for example, the social website) with the social relationship, user behavior occurrence time, a user behavior item name, and a user behavior item label.

Specifically, the recommendation engine analyzes the correlation between the friend behavior record and the current behavior of the user in a manner of item name keyword matching or item label matching, to select a friend behavior record related to the current behavior of the user, that is, generate the recommendation information.

Moreover, the recommendation engine may generate recommendation information satisfying a condition set by the user, where the condition set by the user includes: the user sets that a behavior record of a specific friend is preferably generated; and the user sets friend behavior records in a specific period of time.

The user can set in the application website that only a part of user behavior records is made public.

The recommendation information sending unit 926 is configured to send the recommendation information to the application website.

The recommendation information receiving unit 913 in the application website may be configured to receive the recommendation information sent by the recommendation engine.

Then, the display unit 914 in the application website may be configured to display the recommendation information to the user.

Through the technical solution, when information is recommended to the user, the recommendation information can be generated based on the social relationship and according to the behavior record of the friend of the user. The recommendation information generated according to the behavior record of the friend of the user is more targeted, thereby improving user experience.

Embodiment 7

Figure 10:
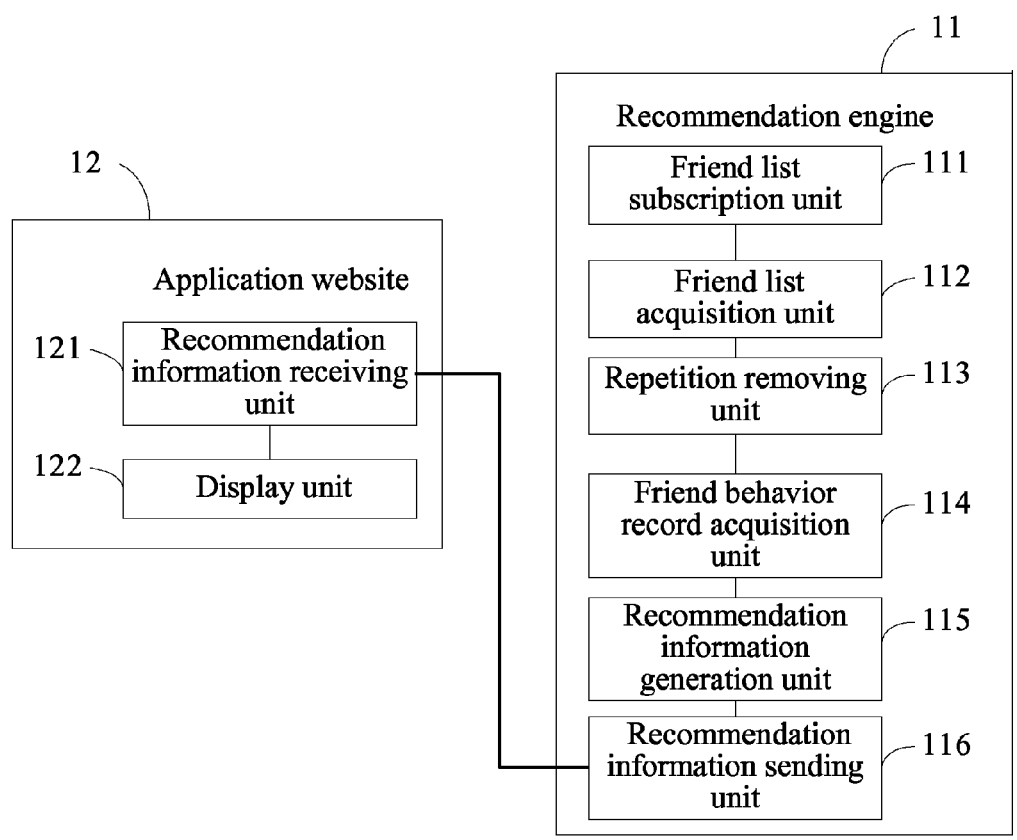
FIG. 10 is a structural diagram of a network system provided by Embodiment 7 of the present invention.

A network system provided by this embodiment is shown in FIG. 10 and includes a recommendation engine 11 and an application website 12. The recommendation engine 11 includes a friend list subscription unit 111, a friend list acquisition unit 112, a repetition removing unit 113, a friend behavior record acquisition unit 114, a recommendation information generation unit 115, and a recommendation information sending unit 116. The application website 12 includes a recommendation information receiving unit 121 and a display unit 122. In this embodiment, the recommendation engine may be one or more servers. The unit in the recommendation engine may be a processor or an Application Specific Integrated circuit. The application website in this embodiment may be a music website or a film website or the like.

Referring to FIG. 10, the friend list subscription unit 111 is configured to subscribe to a friend list of a user from a data source (for example, a social website) with a social relationship.

Specifically, the recommendation engine receives an event for triggering subscription of friend list information of a user A. For example, a user subscribes to the friend list of the user from the data source (for example, the social website) with the social relationship.

The friend list acquisition unit 112 is configured to acquire the friend list of the user from the data source (for example, the social website) with the social relationship.

Specifically, reference is made to the friend list acquisition unit 922 in Embodiment 6.

The repetition removing unit 113 is configured to, when repetitive friends exist in the friend list, retain one of the repetitive friends and delete other repetitive friends.

Specifically, reference is made to the repetition removing unit 923 in Embodiment 6.

The friend behavior record acquisition unit 114 is configured to acquire a behavior record of a friend in the friend list of the user from a user behavior database.

Specifically, reference is made to the friend behavior record acquisition unit 924 in Embodiment 6.

The recommendation information generation unit 115 is configured to generate recommendation information matched with current behavior of the user, according to the behavior record of the friend in the friend list of the user and information of the current behavior of the user.

Specifically, reference is made to the recommendation information generation unit 925 in Embodiment 6.

The recommendation information sending unit 116 is configured to send the recommendation information to the application website.

Specifically, reference is made to the recommendation information sending unit 926 in Embodiment 6.

The recommendation information receiving unit 121 is configured to receive the recommendation information sent by the recommendation engine.

Specifically, reference is made to the recommendation information receiving unit 913 in Embodiment 6.

The display unit 122 is configured to display the recommendation information to the user.

Specifically, reference is made to the display unit 914 in Embodiment 6.

Through the technical solution, when information is recommended to the user, the recommendation information can be generated based on the social relationship and according to the behavior record of the friend of the user. The recommendation information generated according to the behavior record of the friend of the user is more targeted, thereby improving user experience.

The devices, units, and modules in the embodiments of the present invention may be all hardware, such as a processor or a special-purpose circuit.

Persons of ordinary skill in the art should understand that all or a part of the steps in the embodiments may be implemented by hardware or by a program instructing relevant hardware. The program may be stored in a computer readable storage medium. The storage medium may be, for example, a read-only memory, a magnetic disk, or an optical disk.

The above descriptions are merely about exemplary embodiments of the present invention, but the protection scope of the present invention is not limited hereto. Any modification, equivalent replacement, or improvement made by persons skilled in the art without departing from the technical scope disclosed by the present invention should fall within the protection scope of the present invention. Therefore, the protection scope of the present invention is subject to the protection scope of the claims.

What is claimed is:

1. A method for recommending information for users, the method comprising:

receiving, by at least one server in a network, from an application website, a recommendation request carrying information about a user's operation on the application website and identity information of the user associated with a website with social relationship information;

sending, by the at least one server in the network to the website with the social relationship information, a social relationship information request carrying the identity information;

receiving, by the at least one server in the network from the website with the social relationship information, a response to the social relationship information request, wherein the response includes a list of users having a social relationship with the user;

obtaining, by the at least one server in the network, from a user behavior database, operation records of at least one user listed on the list of the users, wherein the operation records are collected from at least one application website;

generating, by the at least one server in the network, recommendation information according to the operation records and the information about the user's operation from the application website, wherein the application website is independent from the website with the social relationship information, the at least one server which is for generating the recommendation information is independent from the application websites and the website with social relationship information; and in response to the recommendation request, sending, by the at least one server in the network the recommendation information to the application website.

2. The method according to claim 1, wherein the list of users from the website with the social relationship information comprises account information of the users listed on the list of users, and the operation records of the at least one user listed on the list of the users are obtained by searching the behavior database with the account information of the at least one user.

3. The method according to claim 1, wherein the recommendation information is generated by matching the operation records of the at least one user listed on the list of the users and the information about the user's operation from the application website.

4. The method according to claim 1, wherein the information about the user's operation from the application website comprises a user operation occurrence time, a user operation, a user operation item name, and a user operation item label.

5. The method according to claim 4, wherein an operation record in the behavior database comprises an account name of the social website, an operation occurrence time, an operation item name, an operation item label, and a user operation action.

6. The method according to claim 5, wherein the recommendation information is generated by matching the user operation item name of the information about the user's operation from the application website with operation item names of operation records of the at least one user listed on the list of the users.

7. The method according to claim 1, further comprising receiving, from the website with social relationship information, a notification for updating the list of the users, and updating the list of users.

8. A server in a network for recommending information for users, the server comprising:
one or more processors; and
a memory coupled to the one or more processors, and the one or more processors are configured to:
receive, from an application website, a recommendation request carrying information about a user's operation on the application website and identity information of the user associated with a website with social relationship information;
send, to the website with the social relationship information, a social relationship information request carrying the user's identity information;
receive, from the website with the social relationship information, a response to the social relationship information request, wherein the response includes a list of users having a social relationship with the user;
obtain, from a user behavior database, operation records of at least one user listed on the list of the users, wherein the operation records are collected from at least one application website;
generate recommendation information according to the operation records and the information about the user's operation from the application website, wherein the application website is independent from the website with social relationship information, the server for generating the recommendation information is independent from the application websites and the website with the social relationship information; and
in response to the recommendation request, send the recommendation information to the application website.

9. The server according to claim 8, wherein the list of the users from the website with the social relationship information comprises account information of the users listed on the list of the users, and the operation records of the at least one user listed on the list of the users are obtained by searching the behavior database with the account information of the at least one user.

10. The server according to claim 8, wherein the recommendation information is generated by matching the operation records of the at least one user listed on the list of the users and the information about the user's operation from the application website.

11. The server according to claim 8, wherein the information about the user's operation from the application website comprises a user operation occurrence time, a user operation, a user operation item name, and a user operation item label.

12. The server according to claim 11, wherein an operation record in the behavior database comprises an account name of the social website, an operation occurrence time, an operation item name, an operation item label, and a user operation action.

13. The server according to claim 12, wherein the recommendation information is generated by matching the user operation item name of the information about the user's operation from the application website with operation item names of operation records of the at least one user listed on the list of the users.

14. The server according to claim 8, the processor further configured to receive, from the website with the social relationship information, a notification for updating the list of the users, and update the list of the users.

* * * * *